Figure 1:
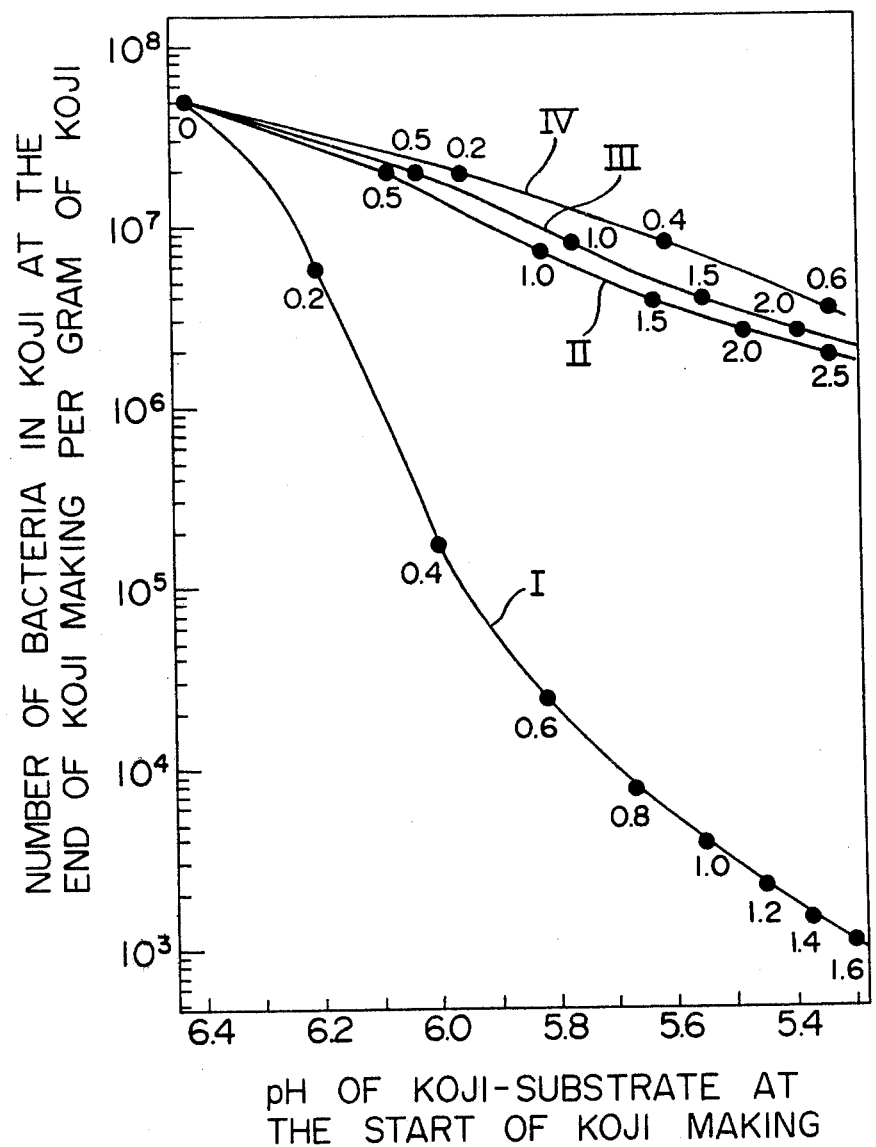

United States Patent [19]

Hayashi et al.

[11] 4,028,470

[45] June 7, 1977

[54] PROCESS FOR PRODUCING KOJI FOR FERMENTED FOOD PRODUCTS

[75] Inventors: Kazuya Hayashi, Kashiwa; Takeji Mizunuma, Noda; Tamotsu Yokotsuka, Nagareyama, all of Japan

[73] Assignee: Kikkoman Shoyu Co., Ltd., Japan

[22] Filed: June 8, 1976

[21] Appl. No.: 693,762

[30] Foreign Application Priority Data

June 18, 1975 Japan .............................. 50-73167

[52] U.S. Cl. ................................. 426/11; 426/46; 426/49; 426/52; 426/589
[51] Int. Cl.² ................... A23L 1/20; A23L 1/238
[58] Field of Search ............... 426/46, 49, 52, 589

[56] References Cited

UNITED STATES PATENTS 2,107,133 2/1938 Snelling ............................... 426/46
3,764,708 10/1973 Aonuma et al. ..................... 426/46

Primary Examiner—Jeanette M. Hunter
Attorney, Agent, or Firm—Sherman & Shalloway

[57] ABSTRACT

Producing koji for fermented food products by modifying an unmodified koji-substrate composed of a vegetable protein material and a vegetable carbohydrate material, inoculating a koji mold in the resulting modified koji-substrate, and cultivating it, wherein said cultivation is carried out in the presence of 0.1 to 1.2% by weight, based on the water content of the modified koji-substrate, of acetic acid added. This process is suitable for use in the manufacture of fermented foods such as soy sauce, miso, or sake.

8 Claims, 1 Drawing Figure

PROCESS FOR PRODUCING KOJI FOR FERMENTED FOOD PRODUCTS

This invention relates to a process for producing koji which is suitable for use in the manufacture of fermented food products such as soy sauce, miso, or sake (Japanese wine from rice).

Particularly, it relates to an improved process for producing koji for fermented food products which makes it possible to inhibit the growth of contaminating bacteria that adversely affect the quality of koji, and facilitate the growth of the koji mold.

More specifically, the invention relates to a process for producing koji for fermented food products which comprises modifying an unmodified koji-substrate composed of a naturally occurring vegetable protein material and a naturally occurring vegetable carbohydrate material, inoculating a koji mold in the modified koji-substrate, and cultivating it preferably at a temperature of about 20 to about 40° C and a pH of about 4.0 to about 7.5, wherein the koji mold is cultivated in the presence of 0.1 to 1.2%, preferably 0.2 to 0.8%, by weight, based on the water content of the modified koji-substrate, of acetic acid added, the acetic acid being added preferably at any time during a period from the modification of the unmodified koji-substrate to the end of the cultivation, especially preferably at any time during a period from the beginning to the middle of the cultivation step.

According to the conventional practice, koji for fermented food products is produced by inoculating a koji mold or a koji mold in the form of a seed starter into a koji-substrate, and cultivating it in a microbiologically open system. Hence, there is a fairly high degree of possibility that contaminating bacteria that adversely affect the quality of the koji prpduct grow and contaminate the cultivation system. When such an undesirable contamination of the cultivation system by bacteria increases beyond allowable degrees, the quality of the koji is deteriorated or its yield reduced. In the technicial field of producing koji for fermented food products, therefore, it has been a problem to prevent this undesirable bacterial contamination. Furthermore, it has also been desired from the standpoint of food sanitation to reduce the contamination of the cultivation system which occurs even to such a degree that does not directly induce the deterioration of the quality of the koji or the reduction of its yield.

A number of suggestions have been made heretofore in an attempt to prevent the bacterial contamination during the production of koji. They include, for example, a classic method for koji making by spraying a mixture of a solid powder of an organic acid such as tartaric acid or citric acid and the spores of koji mold on a koji-substrate, and then cultivating the koji mold (Janpanese Pat. Nos. 66937 patented in 1924 and 81440 patented in 1928), a method in which to use a modified koji-substrate obtained by adding ammonium acetate to an unmodified koji-substrate and then steam-modifying it (Japanese Patent Publication No. 7583/56), and a method in which to use a modified koji-substrate obtained by heating an unmodified koji-substrate in the presence of a lower alcohol, removing the alcohol and adding an inorganic acid or an organic acid other than acetic acid (Japanese Patent Publication No. 15509/66). Furthermore, in an attempt to increase the rate of utilization of the proteinous material of the koji-substrate, Japanese Laid-Open Patent Publications Nos. 33097/73 and 53547/75 suggest a method in which to use a modified koji-substrate obtained by adding a calcium salt or magnesium salt of an inorganic or organic acid, and then steaming it. In these prior suggestions, attempts to provide a sufficient effect against the growth of contaminating bacteria will result in adverse effects on the normal growth of the koji mold, and attempts to avoid the adverse effects will not lead to the satisfactory effect of inhibiting the growth of the contaminating bacteria or will deteriorate the quality of the resulting koji.

Attempt has also been made to inhibit the growth of the undesirable contaminating bacteria by including sulfite salts or sulfurous acid in the koji-substrate. However, this technique has the defect that the amount of sulfurous acid or its salts effective for inhibiting the growth of contaminating bacteria rapidly decreases during the cultivation of the koji mold because, for example, oxidation of sulfurous acid in the koji-substrate and the reaction of sulfurous acid with the components of the koji-substrate take place. This could be avoided by using a larger quantity of sulfurous acid or its salts, but the presence of such a large quantity of sulfrous acid or its salts markedly retards the germination of conidia of the koji-mold or the growth of its hyphae, and adversely affects the quality of the resulting koji. The results are therefore unsatisfactory for practical purposes.

A method has also been proposed in which an antibacterial agent, such as antibiotics, is added to the koji-substrate. Such method should, however, be avoided from the standpoint of food sanitation because resistant bacteria will develop, or the human intake of the antibacterial agent may cause side-effects.

None of these priorsuggestions have been found satisfactory for the inhibition of undesirable contaminating bacteria during the production of koji, and it has been desired to provide easy and effective means of combatting the contaminating bacteria.

We also noted that no suggestion has been made heretofore in which to use acetic acid, an inexpensive and readily available material, for preventing the undesirable bacterial contamination in the production of koji. The specification of Japanese Patent Publication No. 15509/66 cited above suggests the use of various organic and inorganic acids, but the use of acetic acid is positively excluded. The specification states that acetic acid can not be used because even in low concentrations, it markedly inhibits the growth of the koji mold although it can control the contaminating bacteria.

Unexpectedly, we have found to our surprise that when a small amount of acetic acid, which is inexpensive and readily available and causes no trouble in food sanitation, is present in the koji-substrate, the undesirable growth of contaminating bacteria can be markedly inhibited, and on the other hand, it does not in any way inhibit the growth of the koji mold but rather facilitates its growth. The amount of acetic acid used in this invention is far smaller than that which causes a substantial reduction in the pH of the koji substrate in the cultivation of the koji mold. The technique of inhibiting the growth of the undersirable contaminating bacteria in accordance with this invention differs from the concept of the conventional processes which are directed to the substantial reduction of the pH of the koji-substrate. The invention is based on the discovery that the growth of contaminating bacteria is selectively inhibited in a system in which both the koji mold and the contaminating bacteria are growing together, and that this operation does not inhibit the growth of the koji mold, but facilitates it.

We have confirmed that the unique action and effect of inhibiting the growth of the contaminating bacteria cannot be obtained by the use of analogous organic acids such as lactic acid, citric acid, succinic acid or tartaric acid, nor by inorganic acids such as hydrochloric acid, sulfuric acid or phosphoric acid. The time of adding acetic acid is not limited in particular. It may be present during a period starting from the inoculation of the koji mold into the koji-substrate, especially preferably during a period from the beginning to the middle of the cultivation step. The amount of the acetic acid is 0.1 to 1.2% by weight, preferably 0.2 to 0.8% by weight, based on the water content of the modified koji-substrate obtained by modifying an unmodified koji-substrate. If the amount is smaller, it is impossible to obtain an action and effect of inhibiting the growth of contaminating bacteria. If it is larger, the acetic acid exerts adverse effects on the growth of koji mold.

It has also been found that the use of acetic acid in the specified small amounts produces an excellent inhibiting action not only against the growth of most common contaminating bacteria belonging to genus *Micrococcus* and genus *Bacillus*, but also against Gram-negative aerobic bacteria belonging to genus *Pseudomonas* and genus *Achromobacater*, and other contaminating bacteria such as Enterobacteriaceae which might be similarly responsible for the contamination of the cultivation system. We know of no example where *Staphylococcus aureus*, a bacterium causing food poisoning, was separated from koji. But as a result of an experiment wherein *Staphylococcus aureus* was inoculated artificially in a koji-substrate, we have confirmed that the use of acetic acid in the present invention can markedly inhibit the growth of this bacterium. The process of this invention is therefore very advantageous for food sanitation from this viewpoint, too. Thus, we have found that the use of acetic acid in the specified small amounts contributes to the effective inhibition of the growth of a broad range of contaminating bacteria which may occur in a koji-making system.

It is an object of this invention therefore to provide an improved process for producing koji for fermented food products, wherein the growth of a broad range of contaminating bacteria which cause undesirable contamination and quality deterioration to koji can be inhibited with commerical advantage by the use of a small amount of acetic acid, an inexpensive and readily available material, and the acetic acid does not retard the growth of the koji mold but rather facilitates it.

The above and other objects and advantages of this invention will become more apparent from the following description.

According to the process of this invention, koji for fermented food products is prepared by modifying an unmodified koji-substrate composed of a vegetable protein material and a vegetable carbohydrate material, inoculating a koji mold in the resulting modified koji-substrate, and cultivating it. The cultivation is carried out in the presence of 0.1 to 1.2% by weight, preferably 0.2 to 0.8% by weight, based on the water content of the modified koji-substrate, of acetic acid. Acetic acid may be added to the unmodified koji-substrate, or to the cultivation system before the termination of the cultivation. It may be added at any desired period during this period. This specified amount of acetic acid may be maintained during the entire period of cultivation, or the amount can be adjusted to the specified ranges by feeding an additional supply of fresh acetic acid. This is however not altogether necessary, but the objects of this invention can be fully achieved by causing acetic acid to be present in the above specified amounts for a certain period of time during the cultivation step.

In the relatively early period of cultivation of a koji mold or koji mold in the form of a seed starter in a modified koji-substrate, the water content of the koji-substrate is relatively high, and the growth of hyphae of the koji mold is not yet sufficient. Hence, the cultivation system at this stage offers an especially suitable condition for the growth of contaminating bacteria. Accordingly, especially favorable results can be obtained in this invention by adding acetic acid before or during a period from the beginning to the middle of the cultivation step, and cultivating the mold in the presence of 0.1 to 1.2% by weight of the acetic acid during the above period. The acetic acid added to the koji-substrate is assimilated by the koji mold as it grows, and the concentration of the acetic acid in the cultivation system gradually decreases. As required, therefore, additional supply of acetic acid is fed so as to maintain the acetic acid concentration in the koji-substrate at the above specified range during the desired period.

The cultivation conditions can be properly varied according, for example, to the composition of the koji-substrate, or the type of the strain of the koji mold uses. Preferably, the cultivation is performed at a temperature of about 20° to about 40° C and a pH of about 4 to about 7.5. Generally, the cultivation can be carried out for about 30 to about 100 hours. Usually, therefore, the period from the beginning to the middle of the cultivation step which is preferred for the presence of acetic acid in the specified amount is a period which runs about 15 to about 50 hours from the beginning of cultivation. The concentration of acetic acid may be maintained during the entire period or during a certain time in this period.

In performing the process of this invention, an unmodified koji-substrate composed of a vegetable protein material and a vegetable carbohydrate material is subjected to a modifying treatment. This proteinous material includes, for example, vegetable protein materials of the soybean and wheat origin, such as soybean, defatted soybean, dehulled soybean or gluten. The carbohydrate material may for example, include wheat, wheat bran, rice, barley, or oats. Needless to say, these materials can be used in combination. The unmodified koji-substrate may be modified by conventional modifying means. For example, a method of steaming treatment can be used in which water is added to the unmodified koji-substrate or its materials, and it is heated with saturated steam at atmospheric or elevated pressures, followed by cooling the product spontaneously or rapidly, a method of roasting treatment wherein the materials are dry-heated at high temperatures either directly or after adding water, and a method of puffing treatment wherein with or without adding water, the materials are heat-treated with saturated steam or superheated steam at high temperatures, and the product is then rapidly released in the atmosphere at a lower pressure. The steaming, puffing and roasting treatments cited above can be used preferably in the present invention. Other available modifying means can be employed, but heat-treatment in the presence of lower alcohols is not a preferred embodiment.

According to the process of this invention, a koji mold is inoculated to the resulting modified koji-substrate. Acetic acid may be added to the unmodified substrate before the above modifying treatment, or during the modifying treatment, or after the modifying treatment but before the inoculation of the koji mold, or at any time after the inoculation, preferably up the middle of the cultivation step. It is operationally advantageous to add the acetic acid in the form of an aqueous solution diluted to a suitable concentration.

The koji molds used in the process of this invention are known, and include, for example, known molds belonging to the genus *Aspergillus*, such as *Aspergillus sojae*, *Aspergillus oryzae*, or *Aspergillus tamarii*. For the production of soy sauce, known strains such as *Aspergillus sojae* IFO 4241, *Aspergillus sojae* IFO 4243, *Aspergillis sojae* FERM-P504 (ATCC 20387), *Aspergillus oryzae* IFO 4240, and *Aspergillus oryzae* ATCC 14895 can be used preferably. In the above designation of microorganism depositories, IFO stands for Institute for Fermentation, Osaka, Japan; FERM, Fermentation Research Institute, Agency of Industrial Science and Technology, Chiba, Japan; and ATCC, The American Type Culture Collection.

The process of this invention makes it possible to inhibit the growth in koji-substrate of not only contaminating bacteria belonging to the genus Micrococcus and genus Bacillus, but also Gram-negative aerobic bacteria belonging to the genus Pseudomonas and genus Achromobacter, other contaminating microorganisms such as Entero-bacteriaceae, and genus Staphylococcus.

According to the present invention, koji for fermented food products which undergoes little bacterial contamination and has a high enzyme unit can be obtained by a simple operation.

The superior operation and result of the present invention are demonstrated below by an experiment in accordance with one embodiment of the invention.

1. Preparation of a modified koji-substrate, and koji making:

Defatted soybeans were heated in the floating state with superheated steam at 6.0 Kg/cm$^2$.guage for 5 seconds in a heating tube, and then released into the atmosphere to puff the defatted soybeans. An aqueous solution of each of the various organic or inorganic acids in various concentrations was sprayed in an amount of 450 ml (145% based on the soybean weight) per test lot onto 310 g of the resulting modified defatted soybeans to allow the soybeans to abosrb the aqueous solution. Next, 320 g of wheat roasted at 185° C for 40 seconds and then crushed was added to the soybeans. Two grams of a bran cultivated product of *Aspergillus sojae* IFO 4243 (the number of active conidia $1 \times 10^9$/g) was inoculated to the resulting koji-substrate as a koji mold in the form of a seed starter for soy sauce. Then, 1 ml of a suspension of each of the various contaminating bacteria (the number of living cells $4 \times 10^6$/ml) separated from an ordinary soy sauce koji was sprayed uniformly onto the cultivation system. Each of the test lots was placed on a wooden tray, and put in an incubator held at 30° C. After the lapse of 16 hours, the cultivation system was stirred, and then placed in an incubator held at 26° C. The cultivation was performed for a total of 42 hours to form a soy sauce koji.

2. Measurement of the pH of the koji-substrate at the start of cultivation and of the number of contaminating bacteria in koji after the end of cultivation:-

Distilled water was added to each of the substrate and the koji in an amount five times as large as the substrate of koji, and after allowing the mixture to stand for 1 hour, the pH of the solution was measured directly using a pH meter.

The number of contaminating bacteria was measured by a plate colony counting method [after cultivating at 37° C for 24 hours on a glucose-bouillon agar medium containing Kabicidine (trademark for an antifungal agent, a product of Daigo Eiyo Kagaku Kabushiki Kaisha)].

The results of measurement of pH and the number of bacteria are shown in FIG. 1 accompanying this application. Curve I refers to the case of using acetic acid; curve II, to the case of using lactic acid; III, to the case of using citric acid; and IV, to the case of using hydrochloric acid. The numbers attached to the curves represent the concentrations of the acids based on the water content of the substrate used at the start of cultivation.

Similar experiments were carried out using sulfuric acid, phosphoric acid, succinic acid and tartaric acid. The curves obtained with these acids exist between the curves II and IV, and are omitted from FIG. 1.

It is clear from FIG. 1 that the acids tested (except acetic acid) showed only a slight effect of inhibiting the growth of bacteria when the pH of the koji-substrate decreased to a relatively small degree and remained at 5.3 or more, whereas acetic acid exhibited a marked effect of inhibiting the growth of bacteria even when the pH was more than 5.3. This clearly demonstrates that the inhibiting effect of acetic acid is not due merely to its ability to reduce the pH of the koji-substrate. It can also be seen from FIG. 1 that when the pH of the koji-substrate is reduced to below 5.3 with the acids other than acetic acid, the effect of inhibiting the growth of contaminating bacteria can be somewhat increased, but still cannot surpass the inhibiting effect of acetic acid (curve I).

Soy sauce obtained by using koji whose pH had been greatly reduced by an acid other than acetic acid, and aging it together with an aqueous solution of sodium chloride was in a lower yield per unit amount of the koji-substrate than soy sauce obtained by using a koji-substrate to which acetic acid was added in the amounts within the range specified in the present invention.Furthermore, the percentage of free glutamic acid, a principal tasty component of soy sauce, is markedly reduced as compared with the latter, and the quality of the resulting soy sauce is very much deteriorated. Since organic acids other than acetic acid have a low degree of hydrogen ion dissociation as compared with inorganic acids, they must be added in very large amounts in order to decrease the pH of the koji-substrate to a point which will provide a sufficient effect of inhibiting the growth of contaminating bacteria. Not only is the use of such larhge quantities economically disadvantageous, but also a balance of organic acids is destroyed in a fermented food obtained by using koji resulting from the use of such a great amount of the organic acid, and the quality of the food is deteriorated. The use of acids other than acetic acid has therefore been found unsuitable in the present invention.

The following Examples illustrate the present invention more specifically.

EXAMPLE 1

Soy sauce koji was produced in the same way as in the experiment shown above except that acetic acid alone was used as the acid. The relation among the acetic acid concentration in the starting koji-substrate, the growth state of the koji mold, the emzyme unit of the resulting koji, and the number of bacteria present in the koji were examined. The results are shown in Table 1.

Table 1

| Acetic acid concentration (%) | Degree of growth of the koji mold | Protease unit of koji (PU/g) | Number of bacteria per gram of koji | | |
|---|---|---|---|---|---|
| | | | At the start of koji-making | 16 hours after the start | At the end of koji-making (42 hours later) |
| 0 (control) | ++ | 1160 | $4.0 \times 10^3$ | $1.1 \times 10^7$ | $5.0 \times 10^7$ |
| 0.05 | ++ | 1160 | " | $1.0 \times 10^7$ | $5.0 \times 10^7$ |
| 0.1 | ++ | 1240 | " | $4.0 \times 10^6$ | $1.4 \times 10^7$ |
| 0.2 | +++ | 1310 | " | $1.9 \times 10^6$ | $5.6 \times 10^6$ |
| 0.3 | +++ | 1340 | " | $5.1 \times 10^5$ | $1.2 \times 10^6$ |
| 0.4 | +++ | 1370 | " | $9.0 \times 10^4$ | $1.7 \times 10^5$ |
| 0.6 | +++ | 1380 | " | $1.6 \times 10^4$ | $2.3 \times 10^4$ |
| 0.8 | +++ | 1360 | " | $5.8 \times 10^3$ | $7.2 \times 10^3$ |
| 1.0 | ++ | 1290 | " | $3.8 \times 10^3$ | $3.5 \times 10^3$ |
| 1.2 | ++ | 1250 | " | $3.0 \times 10^3$ | $2.2 \times 10^3$ |
| 1.4 | ± | 80 | " | $2.5 \times 10^3$ | $1.5 \times 10^3$ |
| 1.6 | − | 0 | " | $2.0 \times 10^3$ | $1.0 \times 10^3$ |

The symbols showing the degree of growth of the koji mold have the following meaning.
− Growth of hyphae not observed at all.
± Growth of hyphae slightly observed.
++ Both the growth of hyphae and the formation of conidia good.
+++ Both the growth of hyphae and the formation of conidia better than ++.

The protease unit of koji was measured by the following procedure.

The koji was extracted with 10 times its amount of water, and filtered to obtain an enzyme solution. By the Anson-Hagihara's method [the Japanese-language publication entitled "Methods of Studying Enzymes", edited by Shiro Akabori, Vol. 2, pages 237–244, 1962], it was reacted at 30° C for 10 minutes in a borate buffer at a pH of 8.0 using 1% milk casein as a substrate. Then, trichloroacetic acid was added to stop the reaction. The resulting non-proteinous substance was colorimetrically determined using a phenol reagent. The protease unit was defined as the enzyme activity which afforded a color substance in an amount corresponding to 1 μg of tyrosine per minute per gram of the koji under the above reaction conditions ([PU] $\mu g\ tyr.\ ^{Cas.}_{FR.A}/_g$).

As shown in Table 1, the growth condition of the koji mold and the protease unit of the koji were both better than those in the control when the acetic acid concentration based on the water content of the koji-substrate at the start of koji-making is within the range of 0.1 to 1.2%, especially 0.2 to 0.8%, by weight. In addition, within this acetic acid concentration range, the effect of inhibiting the growth of bacteria in koji was remarkable. On the other hand, when the acetic acid concentration was 0.5%, the bacteria inhibiting effect was reduced considerably. Amounts of more than 1.4% resulted in the marked retardation of the growth of the koji mold and at the same time, in the drastic decrease of the protease unit of the koji.

In this example, koji was produced in a koji-substrate to which large quantities of bacteria orginated from ordinary soy sauce koji were added, in order to obtain clear experimental results. Thus, in control example in which no acetic acid was added, the number of contaminating bacteria detected reached $5.0 \times 10^7$ at the end of koji-making.

EXAMPLE 2

1000 Kg of defatted soybean meal was heated in the floating state with superheated steam at 178° C at 6 kg/cm²·gauge for 5 seconds in a heating tube, and then released into the atmosphere to obtain 930 kg of puffed defatted soybeans. 880 liters of hot water at 90° C containing 3.5 kg of acetic acid was sprayed onto the soybeans to cause it to absorb the water, and then 640 kg of wheat roasted at 185° C for 40 seconds and then crushed in a customary product of *Aspergillus sojae* FERM-P504 (ATCC 20387), a koji mold for soy sauce, (the number of active conidia $8.0 \times 10^8$/g) was added as a seed koji to the resulting substrate. The mixture was placed to a height of about 30 cm in a conventional air-circulating koji-making apparatus, and cultivated under aeration for 42 hours in a customary manner. There was finally obtained 1550 kg of good quality koji for making soy sauce which contained only $1.5 \times 10^5$/g of contaminating bacteria.

EXAMPLE 3

125 liters of hot water at 90° C containing 750 g of acetic acid was sprayed onto 92 kg of the puffed defatted soybeans obtained in Example 2, and then the soybeans were allowed to cool. 96 Kg of wheat roasted at 185° C for 40 seconds and then crushed in a customary manner was added. Then, 300 g of a bran cultivated product of *Aspergillus sojae* IAM 2631, a koji mold for soy sauce, (the number of active conidia $1.1 \times 10^9$/g) was mixed with the resulting substrate. The mixture was placed to a height of about 50 cm in a small-sized air-circulation koji-making apparatus, and cultivated. Sixteen hours after the start of koji-making, the culture was stirred by a stirrer, and at the same time, 20 liters of an aqueous solution containing 300 g of acetic acid was sprayed onto the culture and mixed with it uniformly. Twenty-two hours after the start of koji-making, stirring was performed again, and in 44 hours, the koji-making was terminated. There was obtained 242 kg of good quality koji for soy sauce which contained only $8.2 \times 10^3$/g of contaminating bacteria.

EXAMPLE 4

270 liters of water at about 40° C containing 2.2 kg of acetic acid was sprayed onto 200 kg of defatted soybean flakes to allow them to absorb the acetic acid solution. The soybean flakes were then treated with saturated steam at 2 kg/cm$^2$·gauge using a rotary pressure steaming device, and then rapidly cooled. 185 Kg of wheat roasted at 185° C for 40 seconds and crushed, and 600 g of a bran cultivated product of *Aspergillus sojae* IFO 4243, a koji mold for soy sauce, (the number of active conidia 1.5 × 10$^9$/g) as a seed koji were mixed with the modified defatted soybean flakes. The mixture was placed to a height of about 45 cm in a small-sized air-circulating koji-making apparatus, and cultivated in a customary manner for 41 hours. There was obtained 490 kg of good quality koji for soy sauce which contained only 8 × 10$^3$/g of contaminating bacteria.

EXAMPLE 5

400 Kg of soybeans was immersed overnight at room temperature in 1200 liters of water containing 4.8 kg of acetic acid, and withdrawn to free the water. The soybean was then treated with saturated steam at 1.05 kg/cm$^2$·gauge for 55 minutes using a rotary pressure steaming device, and then cooled. Then, 320 kg of wheat roasted at 185° C for 40 seconds and crushed, and 1 kg of a bran cultivated product of *Aspergillus oryzae* IFO 4240, a koji mold for soy sauce, (the number of active conidia 1.2 × 10$^9$/g soybean. The resulting mixture was placed to a height of about 40 cm in an air-circulating koji-making apparatus, and cultivated for 44 hours in a customary manner. There was obtained 840 kg of good quality koji for soy sauce which contained only 8 × 10$^4$/g of contaminating bacteria.

EXAMPLE 6

30 Kg of bran and 10 kg of wheat roasted at 180° C for 40 seconds and crushed were mixed, and 32 liters of water containing 130 g of acetic acid was sprayed onto the resulting mixture. Further, 5 kg of chaff previously washed with water was mixed. The mixture was treated with saturated steam at 1 kg/cm$^2$·gauge for 30 minutes in a pressure steaming device, and then quenched. Then, 50 g of a bran cultivated product of *Aspergillus sojae* IFO 4241 (the number of active conidia 9 × 10$^8$/g) cultivated aseptically in a Fernbach flask was added as a seed koji. The mixture was divided and placed in 80 metallic trays with a lid, and cultivated in an incubator at 25° to 30° C for 68 hours in a customary manner. When the product was dried in a drying chamber at 45° C until the water content of the koji reached about 30%, 49 kg of good quality seed koji for soy sauce production which contained as little as 1.2 × 10$^3$/g of contaminating bacteria and 1.6 × 10$^9$/g of active conidia was obtained.

EXAMPLE 7

Polished non-glutinous rice (160 g) was washed with water, immersed in 210 liters of clean water at 10° C containing 420 g of acetic acid for 6 hours, and then withdrawn to free the water. The rice was then treated with saturated steam at 1 kg/cm$^2$·gauge for 40 minutes in a pressure steaming device, and allowed to cool. Then, 150 g of a rice cultivated product of *Aspergillus oryzae* ATCC 14895 ( a koji mold for miso) (the number of active conidia 1 × 10$^8$/g) was added as a seed koji. The mixture was placed to a height of about 30 cm in a small-sized air-circulating koji-making apparatus, and cultivated for 44 hours in a customary manner. There was obtained 195 kg of good quality koji for miso which contained as little as 2 × 10$^4$/g of contaminating bacteria.

What we claim:

1. A process for producing koji for fermented food products which comprises
    inoculating a koji mold in a modified koji-substrate composed of a vegetable protein material and a vegetable carbohydrate material and selected from the group consisting of steamed koji-substrate, puffed koji-substrate and roasted koji-substrate, and
    cultivating the koji mold in the presence of 0.1 to 1.2% by weight, based on the water content of the modified koji-substrate of acetic acid at a pH of about 4 to 7.5, a temperature of about 20° to about 40° C and for a time sufficient to produce koji for fermented food products.

2. The process of claim 1 wherein said acetic acid is added to said unmodified koji-substrate or at any time during a period from the modification of the koji-substrate to the end of the cultivation.

3. The process of claim 1 wherein said fermented food product is soy sauce, miso, or sake.

4. The process of claim 1 wherein said vegetable protein material is a member selected from the group consisting of soybeans, defatted soybeans, dehulled soybeans, and gluten, and said vegetable carbohydrate material is a member selected from the group consisting of wheat, wheat bran, rice, barley and oat.

5. The process according to claim 1 wherein the cultivation is continued for a period of about 30 to about 100 hours.

6. The process of claim 1 in which the specified amount of acetic acid is present during at least the first half of the cultivation step.

7. The process of claim 6 in which from 0.2 to 8.0% by weight, based on the water content of the modified koji-substrate is present during at least the first half of the cultivation step.

8. The process of claim 1 in which from 0.2 to 8.0% by weight of acetic acid is present during the cultivation.

* * * * *